(12) United States Patent
Hansen

(10) Patent No.: US 6,409,243 B1
(45) Date of Patent: Jun. 25, 2002

(54) SAFETY SEAT FOR LAND, AIR AND SEA VEHICLES

(75) Inventor: Holger Hansen, Hamburg (DE)

(73) Assignee: Autoflug GmbH & Co. (DE)

( * ) Notice: Subject to any disclaimer, the term of this patent is extended or adjusted under 35 U.S.C. 154(b) by 0 days.

(21) Appl. No.: 09/403,446
(22) PCT Filed: Apr. 17, 1998
(86) PCT No.: PCT/DE98/01073
§ 371 (c)(1),
(2), (4) Date: Feb. 14, 2000
(87) PCT Pub. No.: WO98/47762
PCT Pub. Date: Oct. 29, 1998

(30) Foreign Application Priority Data

Apr. 18, 1997 (DE) .......................................... 197 16 215

(51) Int. Cl.[7] .......................... B60R 22/12; B60R 22/18; B60R 22/28; B60N 2/42; A62B 35/04
(52) U.S. Cl. ................. 296/68.1; 280/805; 297/216.17; 297/484
(58) Field of Search ........................ 296/68.1; 280/805; 297/216.17, 484, 467, 468

(56) References Cited

U.S. PATENT DOCUMENTS

| | | | | |
|---|---|---|---|---|
| 1,898,090 A | * | 2/1933 | Lethern ...................... | 297/484 |
| 2,538,427 A | * | 1/1951 | Rogers et al. ............... | 297/484 |
| 2,576,867 A | * | 11/1951 | Wilson, Jr. .................. | 297/484 |
| 2,700,412 A | * | 1/1955 | Evans et al. | |
| 2,829,702 A | * | 4/1958 | Keating .................... | 297/183.9 |
| 2,839,123 A | * | 6/1958 | Summitt .................... | 297/468 |
| 3,314,720 A | * | 4/1967 | Millington et al. .... | 297/216.17 |
| 3,512,830 A | * | 5/1970 | Norman et al. ............. | 297/484 |
| 3,868,143 A | * | 2/1975 | Reilly ................... | 297/216.17 |
| 3,885,810 A | * | 5/1975 | Chika ....................... | 296/68.1 |
| 4,402,548 A | * | 9/1983 | Mason ....................... | 297/484 |
| 4,474,347 A | * | 10/1984 | Hazelsky .................... | 297/216 |
| 4,523,730 A | * | 6/1985 | Martin .................. | 297/216.17 |
| 4,525,010 A | * | 6/1985 | Trickey et al. ......... | 297/216.17 |
| 5,328,226 A | * | 7/1994 | Thomas ..................... | 296/68.1 |
| 5,641,200 A | * | 6/1997 | Howell ....................... | 297/484 |
| 5,658,013 A | * | 8/1997 | Villarreal et al. ........... | 280/805 |
| 6,089,662 A | * | 7/2000 | Lambert et al. ............ | 297/484 |
| 6,247,756 B1 | * | 6/2001 | Wagner ..................... | 297/484 |

FOREIGN PATENT DOCUMENTS

| | | | |
|---|---|---|---|
| DE | 3306839 | * | 9/1984 |
| DE | 4303719 | * | 8/1994 |

* cited by examiner

Primary Examiner—Stephen T. Gordon
Assistant Examiner—Hilary Gutman
(74) Attorney, Agent, or Firm—R. W. Becker & Associates; R. W. Becker

(57) ABSTRACT

A safety seat built into a land, air or sea vehicle is provided. A structure is fixed to the vehicle and comprises vertically disposed side components that are anchored at seat-width intervals. A safety belt member is secured to the structure and has two shoulder belts and two lap belts that are joined at a fastener. A seat belt extends transversely between the side components and upwardly there along and in an upper region of the back area of the safety seat is connected to each side component. The two shoulder belts cross one another between the side components as they extend from a connection in the vicinity of a respective side component to the other side component and then to the fastener. Back belts are provided as support belts and extend from the seat belt, parallel to the side components, upwardly to the shoulder belts, where they are connected.

14 Claims, 3 Drawing Sheets

SAFETY SEAT FOR LAND, AIR AND SEA VEHICLES

BACKGROUND OF THE INVENTION

The specification incorporates by reference the disclosure of German priority document 197 16 215.0 of Apr. 18, 1997 and International priority document PCT/DE98/01073 of Apr. 17, 1998.

The invention concerns a safety seat for land, air, and ocean vehicles comprising a seat member and a back member and furthermore comprising a safety belt member that comprises two shoulder belts and two lap belts and that can be attached to a fixed vehicle structure, the shoulder belts and the lap belts extending into a fastener.

There is a problem, in particular with vehicles used for air travel and also vehicles used for sea travel, preferably transport aircraft and helicopters, that in addition to transporting troops, as large a transport or loading surface as possible should be available. For this reason the seats used for transporting personnel should be as easy to remove as possible and should furthermore stow efficiently in terms of space.

On the other hand, the seats should provide the highest degree of protection against demands on the body that can occur during transport because the seats are generally arranged perpendicular to the direction of flight, particularly in transport aircraft and helicopters, so that in an unavoidable crash the impact energy acts laterally on the body of the occupant being transported. Likewise, an analogous safety issue arises in land vehicles, in which, e.g., high impact energies can result from a mine detonating if the vehicle is thrown into the air and falls back to the ground.

U.S. Pat. No. 4,474,347 describes a safety seat comprising generic features; a fixed seat is connected to frame bars that are anchored to the floor and that embody shock absorbers. The back support is webbing that is suspended between two belts that themselves are suspended from the frame bars of the seat to the roof of the vehicle. For the safety of the occupant, a restraint system is arranged comprising two lap belts attached to the frame bars holding the seat and two shoulder belts attached to the suspended belts, wherein the shoulder belts and the lap belts extend into a central fastener.

Another safety seat is known from U.S. Pat. No. 3,314,720. This known safety seat comprises a foldable seat frame that is mounted on an aircraft part and that comprises a seat member, wherein a shell that is made of a textile fabric and that comprises a back member and two side members is affixed to the seat frame by means of a belt. The safety of an occupant sitting on the seat is maintained by means of a three-point safety belt comprising a lap belt mounted to the seat frame and furthermore comprising a diagonal shoulder belt affixed to the strap that attaches the textile shell.

U.S. Pat. No. 2,700,412 provides an additional safety seat in which a textile seat is suspended between a foldable seat frame mounted to a vehicle part; a textile surface suspended in the same manner between two bar members is a back support. The safety of the occupant is maintained by means of simple lap belts affixed to the seat frame.

Each of the known seats suffers from the disadvantage that, first, the safety of the occupants by means of the safety belts used is completely insufficient in terms of transverse acceleration because, due to the acceleration forces acting on the body of the occupant, either the body is subject to great pressure on the seat and into the belt or, depending on the design of the seatbelt, the body can even twist out of the belt entirely. Secondly, the load surface cannot be fully utilized, despite the fixed installation of the built-in members (which are in part foldable) in the seat design, and especially for energy-absorbing attaching of the safety belts. In addition, it is relatively expensive to fit vehicles with the required built-in members, and these members must be taken into consideration when the vehicle is manufactured.

The object of the invention is therefore to provide a safety seat that comprises the generic features, that offers more effective protection to occupants against transverse acceleration, and that is also relatively simple to remove and transport and/or travel with.

SUMMARY OF THE INVENTION

The solution for this object, including advantageous embodiments and further developments of the invention follows this specification.

The basic concept of the invention is that the fixed vehicle structure comprises vertically disposed side components anchored at seat-width intervals; that the safety belt member as seat component comprises a seat belt that extends under the posterior of the occupant and up on both sides of the body, and in the occupant's shoulder region connects to each of the components; and that each of the two shoulder belts extends from its coupling in the region of the one shoulder, crosses the other belt behind the neck of the occupant, and extends over the other shoulder to the fastener, wherein back belts that support the posterior and back of the occupant extend at the seat belt up to the shoulder belts and connect thereto.

The invention is distinguished advantageously in that the occupant is protected in a belt member that completely encircles his body, wherein in particular the safety belt member comprises not only a retaining function, but also comprises an energy absorbing and diverting function by means of the seat belt that absorbs and diverts the forces and is attached to a fixed vehicle structure because the safety belt member directly absorbs all acceleration forces in the downward direction. In addition, due to the inherent resilience of the material, the safety belt member is itself energy-absorbing. Furthermore, the safety belt member encircling the body of the occupant provides complete protection against transverse acceleration that occurs. The safety seat is furthermore simple to remove and stow, saving space. Since the safety belt member completely encircles the body of the occupant, the safety seat can be used for all load directions so that this safety seat can be installed in any configuration, without regard to other considerations related to the vehicle as long as suitable fastening points are provided on the fixed vehicle structure. In addition, the safety seat is advantageously light-weight and cost-effective to manufacture.

A particular advantage of the invention is that the two shoulder belts extend around the strapped-in occupant such that they cross behind the neck of the occupant and encircle the occupant's torso in a sling-like manner; this arrangement of the shoulder belts safely prevents transverse displacement and furthermore safely prevents the torso from twisting out of the arrangement when acted upon by transverse acceleration. Nor does the occupant slip out during an upward acceleration.

In accordance with one exemplary embodiment of the invention, each of the shoulder belts comprises an integrated force limiter that reduces the peak loads acting on the occupant.

In accordance with exemplary embodiments of the invention it is provided that the lap belts transition into the shoulder belts or alternatively are immediately attached on both sides of the body to the fixed vehicle structure in the form of the fixed vehicle lateral components, and due to this arrangement the loads resulting from accelerations and acting on the occupant are introduced directly into the fixed vehicle components.

It can be provided that the safety belt member is attached to sliding elements that are movable along the fixed vehicle lateral components; it can be useful for the sliding elements to comprise a force limiting device, wherein such a force limiting device can comprise a mechanical shock absorber or can be made of a textile. With such an arrangement, downward acceleration forces are effectively reduced such that they are not injurious to the occupant.

In accordance with one exemplary embodiment of the invention, it can be provided that the sliding elements arranged on the same side of the safety seat are mutually connected by means of a spacer, and that the spacer can also comprise an additional force limiting device.

In accordance with one exemplary embodiment of the invention it can be provided that each of the upper and lower sliding elements on one side of the occupant is connected to the corresponding sliding element on the opposing side by means of a cross-bar. Due to this arrangement, the accelerations acting on the safety seat are conveyed uniformly to the fixed vehicle structure. The options for attaching the safety belt member in such an arrangement increase in an advantageous manner so that the attachment of the safety belt member can also be at the cross-bars.

In accordance with one exemplary embodiment of the invention, the fixed vehicle lateral components and the cross-bars are tubular rods.

In accordance with exemplary embodiments of the invention, the safety seat in its back area and/or seat area comprises a textile fabric for additional support, wherein such a textile fabric can furthermore be provided between the segments of the seat belt rising diagonally to the shoulder region and the back belts of the safety belt member; in this case the shape of the safety seat is similar to the seat known from U.S. Pat. No. 3,314,720.

Finally, in accordance with an exemplary embodiment it can furthermore be provided that the safety seat comprises a seat platform that is intended to increase the comfort of the occupant during travel; this seat platform can be foldably attached to the fixed vehicle structure.

Figure 1:
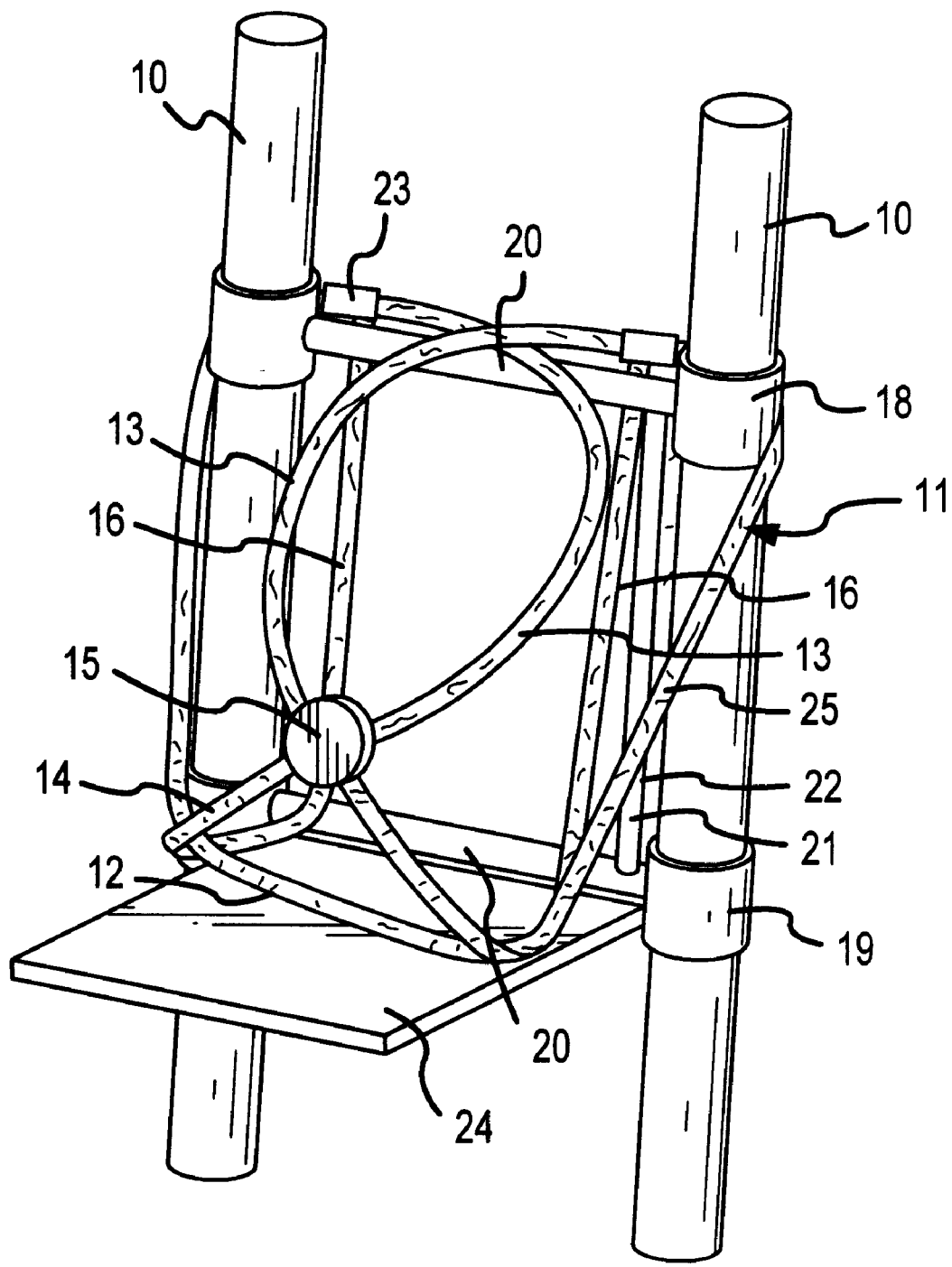
FIG. 1 shows the safety seat of the present invention in a perspective view.
Figure 2:
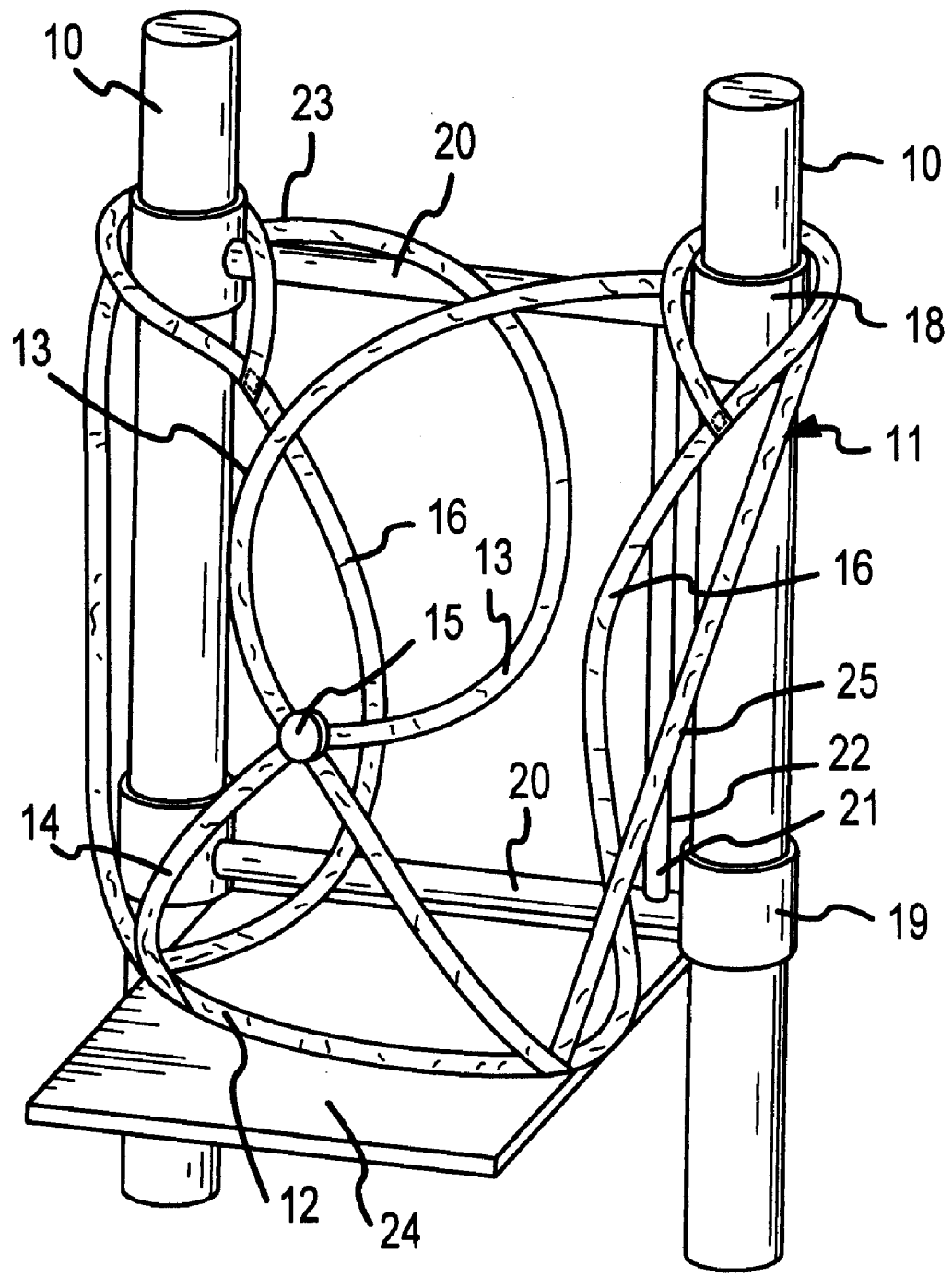
FIG. 2 shows a further embodiment of the safety seat of the present invention in which the back belts are attached about the vertical bars.
Figure 3:
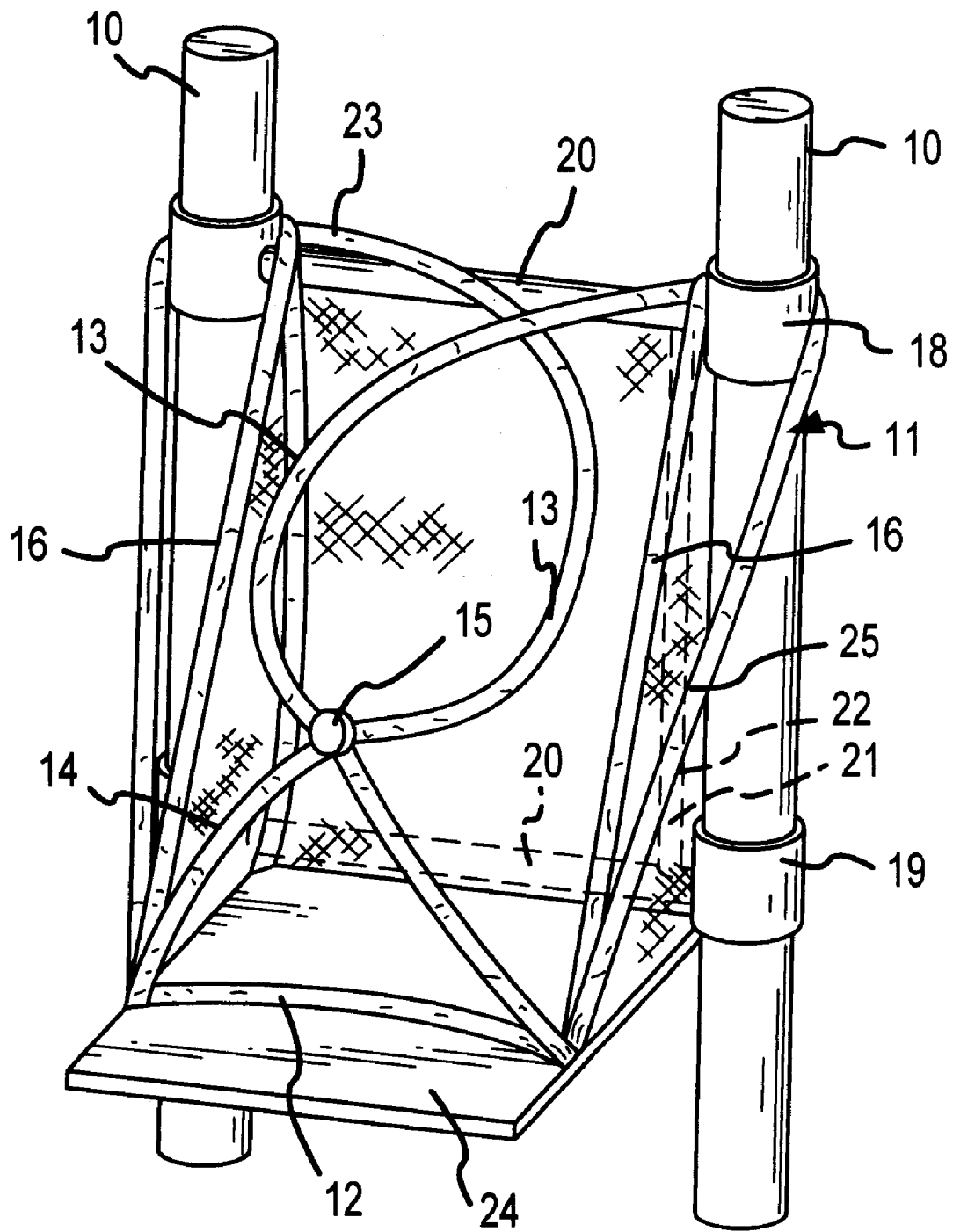
FIG. 3 shows the safety seat of FIG. 1 with mesh webbing.

However, due to the arrangement of the seat belt, this seat platform does not constitute a structurally stressed component during accelerations because the safety belt member absorbs the forces even when there is an arrangement with a seat platform.

DESCRIPTION OF PREFERRED EMBODIMENT

In the exemplary embodiment shown, anchored in a lateral arrangement at seat-width in a fixed manner for holding the safety seat to the vehicle are two bars or tubular columns 10; attached thereto is the safety belt member 11 constituting the safety seat. The safety belt member 11 comprises a seat belt 12 that runs under the posterior of the occupant and rises on both sides of the body as segment 25 and is attached to the bars 10 in the shoulder region of the occupant to be belted in. The safety belt member 11 furthermore comprises two shoulder belts 13, each extending from opposing shoulders behind the neck of the occupant to the side of the opposite shoulder and from there to a fastener 15 positioned centrally over the mid-section of the occupant, where it is locked to the other shoulder belt. A component of the safety belt member 11, two pelvic or lap belts 14 also terminate in this central fastener 15. The lap belts 14 run from the central fastener 15 to the seating area and are led under the posterior of the occupant as back belts 16 and thereby cross the seat belt 12; the back belts 16 extend up to the upper part of the shoulder belts 13 and are connected here to the shoulder belts 13. Alternatively, however, it can be provided that the lap belts 14 connect to the bars 10 directly and that the back belts 16 constitute separate components of the safety belt member 11. Force limiting devices 23 are inserted in the upper part of each of the shoulder belts 13 in the exemplary embodiment illustrated.

In the exemplary embodiment illustrated, provided for fastening the safety belt member 11 to the bars 10 are sliding elements that are movable along the bars 10, and these are upper sliding elements 18 and lower sliding elements 19 that are embodied as sleeves because the fixed aircraft structure is designed as bars. Each of the sliding elements situated on a bar 10 is connected to the other by means of spacers 21 that comprise an energy absorption apparatus 22 as a force limiting apparatus so that the sliding elements 18, 19 cannot be displaced without simultaneous force attenuation. Furthermore, opposing sliding elements 18, 19 affixed to the two different bars 10 are mutually connected by cross-bars 20 so that in this manner the fixed vehicle structure is stiffened overall.

Additionally provided in the exemplary embodiment illustrated is a seat platform 24 that is mounted to the two lower sliding elements 19 on the two bars 10, wherein this platform 24 however does not constitute a component subjected to structural load when there is downward acceleration. The seat platform 24 can be foldably mounted on the bars 10 (not shown in greater detail).

It is also possible to insert in the seat surface area and/or in the back region additional textile fabric (also not shown) that can also be padded. Furthermore, the region to the side of the body between the bars 10 and the seat belt 12, which at this location extends on a diagonal, can be covered with a textile fabric.

The present invention is, of course, in no way restricted to the specific disclosure of the specification and drawings, but also encompasses any modifications within the scope of the appended claims.

The features of the subject matter herein as disclosed in the foregoing specification and in the claims, abstract, and drawing, in any desired combination, can also be essential for realizing the invention in its various embodiments.

What is claimed is:

1. A safety seat built into a land, air or sea vehicle, said safety seat having a seating area and a back area and comprising:

a structure that is fixed to a vehicle and comprises vertically disposed side components anchored at seat-width intervals; and a safety belt member that is secured to said structure and has two shoulder belts and two lap belts, wherein said shoulder belts and said lap belts are joined at a fastener, wherein said safety belt member, as a seat component, has a seat belt that extends transversely between said side components and upwardly along said side components and in an upper region of said back area of said safety seat is connected to each of said side components, wherein said two shoulder belts cross one another between said side components as said two shoulder belts extend from a connection in the vicinity of a respective one of said side components, to the other side component, and then to said fastener, and wherein back belts are provided as support belts and extend from said seat belt, parallel to said side components, upwardly to said shoulder belts, where said back belts are connected.

2. A safety seat according to claim 1, wherein said two shoulder belts have an inserted force limiter.

3. A safety seat according to claim 1, wherein said lap belts transition into said back belts.

4. A safety seat according to claim 1, wherein said lap belts, on opposite sides of said seating area of said safety seat, are anchored to said side components.

5. A safety seat according to claim 1, wherein sliding elements are moveably disposed on said side components, and wherein said safety belt member is attached to said sliding elements.

6. A safety seat according to claim 5, wherein said sliding elements are provided with a force limiting device.

7. A safety seat according to claim 5, wherein those of said sliding elements disposed on the same side component are interconnected by means of a spacer.

8. A safety seat according to claim 7, wherein said spacer is provided with a force limiting device.

9. A safety seat according to claim 5, wherein respective upper and lower ones of said sliding elements on opposite side components are interconnected via respective cross-bars.

10. A safety seat according to claim 9, wherein said safety belt member is attached to said cross-bars.

11. A safety seat according to claim 9, wherein said side components and said cross-bars are tubular rods.

12. A safety seat according to claim 1, wherein a textile webbing, for additional support, is connected to said safety belt member in said back area and/or in said seating area.

13. A safety seat according to claim 1, wherein respective textile webbing is provided for lateral support between said back belt of said safety belt member and segments of said seat belt that rise diagonally to a shoulder region.

14. A safety seat according to claim 5, wherein a seat platform is provided that is connected to respective lower ones of said sliding elements that are disposed on said side components.

* * * * *